United States Patent [19]
Cathey et al.

[11] Patent Number: 4,515,577
[45] Date of Patent: May 7, 1985

[54] LOW BACKLASH-HIGH-TORQUE POWER TRANSMISSION SYSTEM AND TOOTHED BELT USED THEREIN

[75] Inventors: Thaddeus F. Cathey, Woodbury; John C. Gaynor, Wolcott; Rodney J. Nelson, Southbury, all of Conn.

[73] Assignee: Uniroyal, Inc., Middlebury, Conn.

[21] Appl. No.: 435,435

[22] Filed: Oct. 20, 1982

[51] Int. Cl.[3] .......................... F16G 5/20; F16G 1/28
[52] U.S. Cl. .................................. 474/204; 474/205; 474/153
[58] Field of Search ............... 474/204, 205, 153, 154, 474/250, 251

[56] References Cited

U.S. PATENT DOCUMENTS

| 2,937,538 | 5/1960 | Worrall | 474/153 X |
| 3,756,091 | 9/1973 | Miller | 474/205 X |
| 3,924,481 | 12/1975 | Gregg | 474/205 X |
| 3,969,946 | 7/1976 | Gregg | 474/153 |
| 3,977,265 | 8/1976 | Worley et al. | 474/153 |
| 4,041,789 | 8/1977 | Hoback | 474/205 X |
| 4,233,852 | 11/1980 | Bruns | 474/205 X |
| 4,337,056 | 6/1982 | Bruns | 474/205 X |
| 4,403,979 | 9/1983 | Wujick | 474/205 X |

FOREIGN PATENT DOCUMENTS

| 2412762 | 12/1978 | France | 474/205 X |
| 2084688 | 4/1982 | United Kingdom | 474/205 X |
| 2085999 | 5/1982 | United Kingdom | 474/205 X |
| 2109503 | 6/1983 | United Kingdom | 474/205 X |

Primary Examiner—Stephen J. Novosad
Assistant Examiner—Thuy M. Bui
Attorney, Agent, or Firm—Jack Posin

[57] ABSTRACT

A flexible power transmission belt having a plurality of teeth each of which has a pair of arcuate convex flank portions which in longitudinal cross-section closely approximate to an arc of a circle. Each tooth exhibits a height to width relationship within a predetermined range, and the arcuate flanks each have a pressure angle within a predetermined range. The belt is preferably used in combination with a toothed pulley whose teeth are substantially conjugate to the belt teeth and whose cavities between the teeth have a height to width relationship within another predetermined range and have concave flanks exhibiting a pressure angle in still another predetermined range, said belt tooth width being approximately 0.98 of the pulley cavity width so as to provide a high torque positive drive power transmission system having minimum backlash.

36 Claims, 6 Drawing Figures

LOW BACKLASH-HIGH-TORQUE POWER TRANSMISSION SYSTEM AND TOOTHED BELT USED THEREIN

BACKGROUND OF THE INVENTION

This invention relates to power transmission systems utilizing toothed power transmission belts cooperating with toothed pulleys, and also relates to belts and pulleys for use in such a system.

Power transmission systems are known utilizing belts having a plurality of alternating teeth and grooves extending generally transversally of the belt and meshing with alternating teeth and cavities in a grooved pulley in order to perform a driving function. Many such belt and pulley systems are currently in use and considerable work has been done in designing the optimum shapes for the cross-sections for the teeth and grooves on both the belt and the pulley. For example, U.S. Pat. No. 3,756,091 to Miller discloses a positive drive system in which the belt includes relatively closely spaced together driving teeth of a special curvilinear cross-sectional configuration which is operated in conjunction with mating pulley cavities defined between pulley teeth having curvilinear cross-sections which are substantially conjugate to the teeth of the belt. Given a toothed belt in combination with a pulley, the conjugate form of the belt tooth is that tooth form described on the pulley which corresponds to the volume between the belt and the pulley which is not swept out by the belt tooth as the belt moves into contact with the pulley. Use of conjugate teeth on the pulley is desirable as it insures that the belt and pulley teeth are able to engage and disengage without interference.

Belts having substantially curvilinear teeth in accordance with the Miller patent resulted in reduced belt tooth shear and increased horsepower capacity. While the toothed power transmission belt and pulley system of the Miller patent has proven valuable for many commercial applications, particularly for high torque drive applications, the almost vertical tooth flank and the substantial depth of the teeth of the Miller belt require that it be used with a pulley cavity that is substantially wider than the belt tooth. It is this clearance, inherent in the Miller construction, that results in backlash. The precision of indexing, or positioning, drives is controlled by the backlash or clearance between the belt tooth flanks and the cooperating pulley cavity flanks. None of the toothed belt and pulley power transmission systems known today are capable of providing, particularly at high loads, the precision indexing required in such equipment as high-speed printers, machine tool positioners, or computer controlled assembly robots.

It will be seen that while it may be possible to take belts of known construction and increase the belt tooth width dimension and/or have such belts cooperate with pulleys in which the cavity width dimension is decreased, such constructions, while possibly reducing backlash, would result in substantially reduced belt life, increased noise, and/or require more driving power because they would necessarily result in meshing interference between belt tooth and pulley cavity. The minimum clearance required to prevent entry or exit meshing interference for any belt tooth design can be found by rolling the belt tooth on the pitch diameter of the smallest pulley with which it is intended to be used. The profile that the belt tooth sweeps out as it enters and exits the pulley defines the minimum pulley cavity profile (i.e. conjugate pulley cavity) with which the belt tooth will mesh without interference.

The Hoback patent, U.S. Pat. No. 4,037,485, discloses a power transmission system which, when the belt thereof is put under sufficient tension the material of the individual belt teeth spreads within the pulley cavities so as to substantially fill those cavities and thereby substantially reduce backlash. However, such a construction has been found not to be practical since the high tension required and the resulting interference between the belt teeth and pulley cavities, when meshing, result in accelerated wear of the belt jacket material so as to substantially reduce the operational life thereof. Furthermore, the high tension which is required by Hoback results in a loss of useful power and necessitates a strengthening and overdesigning of the structural components of the system. All of these disadvantages are overcome by the system according to the present invention.

SUMMARY OF THE INVENTION

In some drive applications, it would be advantageous to be able to use a belt and pulley power transmission system which would retain the benefits of the generally arcuate flanks of the aforesaid Miller patent, of U.S. Pat. No. 3,924,481 to Gregg and of the Bruns U.S. Pat. No. 4,337,056, while having a tooth shape and dimensional relationship such that the required clearance between the belt tooth flank and the pulley cavity flank is reduced. Such reduction in clearance would serve to reduce the system backlash and thereby make the system suitable for precise positioning and/or indexing mechanisms at high torque load.

The principal object of the invention is therefore to provide a power transmission system that is practical for high-speed, high-torque applications while exhibiting sufficiently low-backlash so as to be suitable for precise positioning and/or indexing mechanisms yet having the minimum clearance between belt teeth and pulley teeth which is required to prevent entry or exit meshing interference between the two.

It is another object of the invention to provide a flexible drive belt having a series of spaced teeth which are substantially curvilinear in longitudinal cross section, which have convex arcuate flanks, which have a height to width ratio within a first given range and a flank pressure angle within a second given range.

It is still another object of this invention to provide a pulley for use with the aforesaid flexible drive belt, which pulley has a plurality of teeth separated by cavities, each such cavity having a longitudinal cross-sectional contour that is essentially U-shaped and is defined by walls having arcuate flanks which are concave with respect to the body of the pulley and the cavities having a height to width ratio within a first given range, and the pressure angle of said cavity flanks being within a second given range.

It is a concomitant object of the present invention to provide a power transmission system having a belt tooth and mating pulley cavity of a design such that the clearance between the belt tooth flank and the pulley cavity flank which is required for proper meshing, is minimized resulting in minimum backlash of the system.

As noted above, according to the present invention, the backlash or lag of a toothed belt and pulley power transmission system is substantially reduced when compared with systems currently known for use in high torque applications, without sacrificing good meshing characteristics of the drive, i.e. without wear producing interference between portions of the belt teeth and the pulley cavities during the time a belt tooth enters and or exits from the cavity when the system is in operation. This highly desirable result is achieved in accordance with the present invention by shaping the belt teeth and the pulley cavities in accordance with a very carefully chosen set of parameters. Namely, the height to width ratio of the belt tooth, as well as the depth to width ratio of the cavity of the pulley, must be within the predetermined ranges herein set forth, the flanks which are the principal working surfaces of the belt tooth must have a convex arcuate contour in longitudinal cross-section which arcuate contour must be a curve which closely approximates the arc of a circle drawn from a center line preferably located on the belt land line on the side of the vertical axis of the tooth which is opposite to the side on which the arcuate flank is located. Furthermore the arcuate flank curve must pass through two given points, one of which is located at a distance of 0.3W from the belt land line and the second of which forms an end point of the flank curve and is located closer to the belt line than the first point and is also the point at which the belt tooth width W is measured. The arcuate flank curve must further be such that a tangent drawn thereto at the point which is at the distance equal to 0.3W from the belt land line will make an angle with the vertical center line of the belt tooth which angle must be within the given, predetermined range for such angle hereinafter set forth.

BRIEF DESCRIPTION OF THE DRAWINGS

The invention will be better understood from the following specific description given in conjunction with accompanying drawings in which:

FIG. 6 is an enlarged fragmentary longitudinal side view of a mating pulley and belt, according to FIGS. 4 and 5 with the belt wrapped around the pulley under a no-load condition.

DETAILED DESCRIPTION OF THE INVENTION

Figure 1:
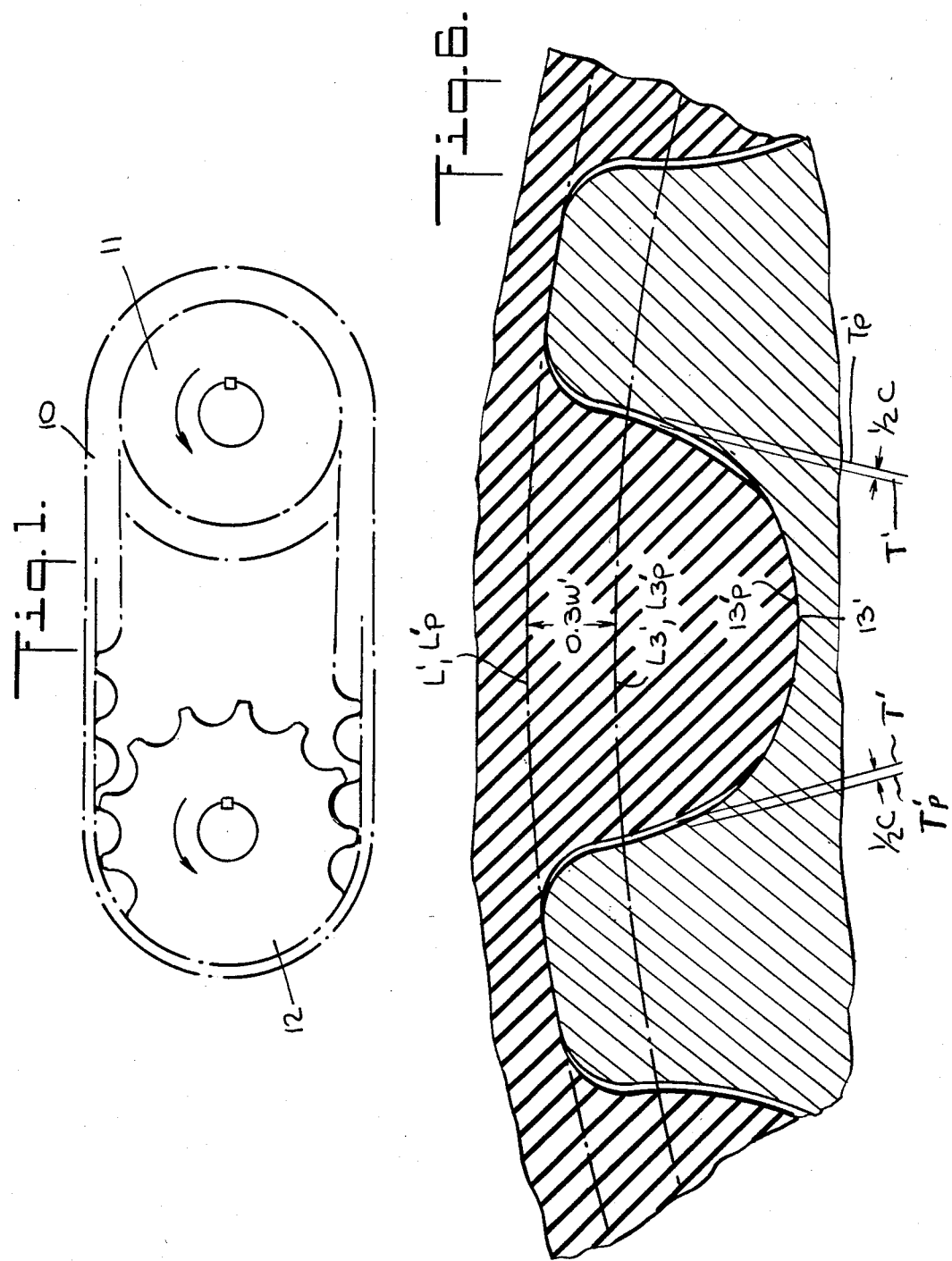
FIG. 1 is a longitudinal cross-sectional view looking transversally of the positive drive of this invention showing a belt in engagement with two cooperating pulleys.
Figure 2:
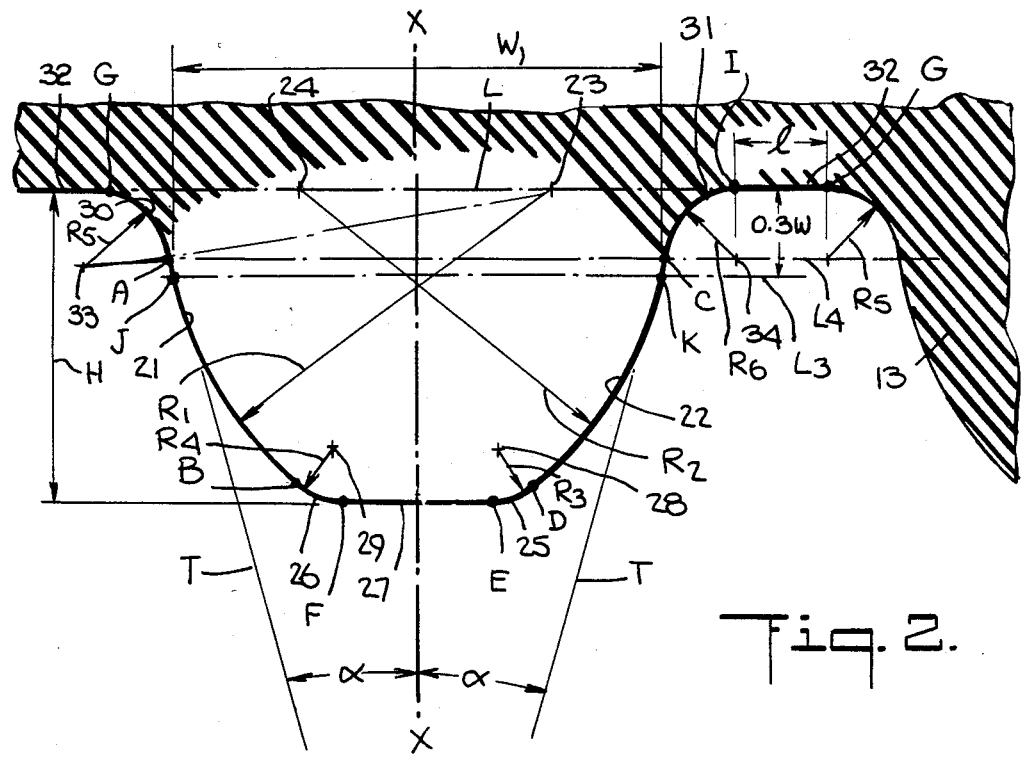
FIG. 2 is an enlarged fragmentary longitudinal cross-sectional view of a belt in accordance with this invention.

As seen in FIG. 1, an endless belt 10 engages driving and driven pulleys 11 and 12. U.S. Pat. No. 2,507,852 to Case and U.S. Pat. No. 3,756,091 to Miller may be consulted for a more detailed description of this general class of toothed belt and pulley system and the construction thereof. The entire contents of the Case and Miller patents are hereby incorporated herein by reference. The belt 10 may be made in any one of a number of ways, but it is preferable to use the method described in U.S. Pat. No. 3,078,206 to Skura, the entire contents of which are also incorporated herein by reference. An alternative method for manufacture of the belt is described in the aforesaid Case Patent. FIG. 2 shows a typical profile of a belt tooth according to the invention. The profile of the tooth is made up as follows. Each tooth 13 is of substantially U-shaped longitudinal cross-section symmetrical with respect to a tooth center line X—X. Each tooth 13 has a pair of symmetrical opposed flank portions formed by curved lines 21 and 22, respectively, each approximating to an arc of a circle and forming a tooth with substantially identical fore and aft portions. The arc 21 is drawn from center 23 on the belt land line L, is of a radius R1 and extends from point A to point B. The belt land line L is the line connecting line segments 32 of length l which represent, in longitudinal cross-section, the surface of the belt at the land regions thereof, i.e. between adjacent belt teeth 13. The arc 22 is drawn from center 24, is of radius R2 and extends from point C to point D. The centers 23 and 24 are displaced from each other and lie on the belt land line L on opposite sides of the radial center line X—X of the belt tooth 13. The center 23 and the arc 21, drawn from that center, lie on opposite sides of the center line X—X and similarly, the center 24 and arc 22 drawn from that center, lie on opposite sides of the center line X—X. The radii R1 and R2 are equal and their respective centers 23,24 lie at equal distances from the center line X—X.

The tip of each belt tooth is preferably formed by two further curved lines 25 and 26, each being an arc of a circle, and connected by a line segment 27 having end points E and F. The arc 25 is drawn from a center 28, has a radius R3 and extends from point D to point E. The arc 26 is drawn from center 29, has a radius R4 and joins points B and F. The centers 28 and 29 are displaced one from another, lie at equal distances at opposite sides of the tooth center line X—X and lie on a line which is parallel to the belt land line. The radii R3 and R4 are equal. In the FIG. 2 embodiment the line segment 27 is flat and has an outermost surface portion located a distance H from the belt land line L. The distance H represents the height of the belt tooth.

Teeth 13, as seen in the sectional view of FIG. 2 are constructed so that the outermost portions thereof have a longitudinal cross-sectional configuration which is constant across the transverse cross-section of the belt and which is substantially composed of the arcs 21 and 22 forming the flanks, the arcs 25 and 26 together with line segment 27 forming the tip and the arcs 30 and 31 forming the roots thereof. The arcs 30 and 31 of adjacent teeth 13 are connected by a line segment 32, having end points I and G, which represents the longitudinal length of the land area between adjacent teeth and also defines the belt land line L. The arc 30 is drawn from a center 33, is of radius R5 and extends from point A to point G. The arc 31 is drawn from a center 34, is of radius R6 and extends from point I to point C. Line segment 32 connects point I of one belt tooth 13 to point G of an adjacent belt tooth 13.

Each tooth 13 has a longitudinal width W measured between the points A and C where the root arcs 30 and 31 intersect the respective flank arc 21 and 22.

Figure 4:
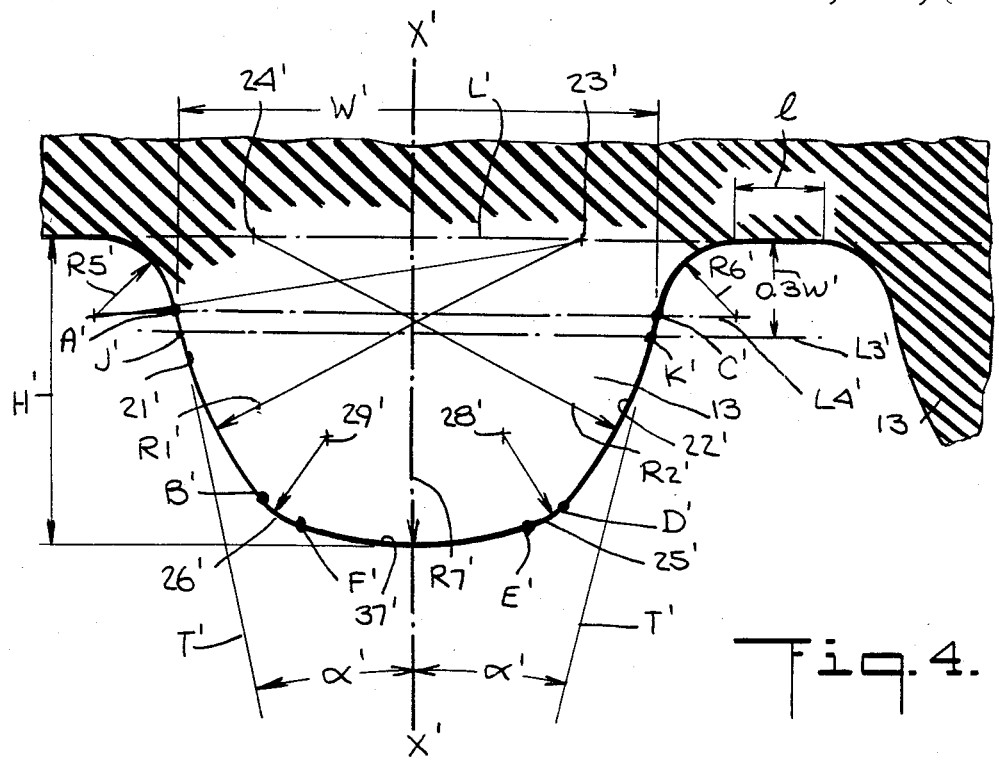
FIG. 4 is an enlarged fragmentary longitudinal cross-sectional view of another specific embodiment of a belt according to this invention.

The convex curves of the belt tooth flanks 21, 22 have a length (measured along their curved contour) in longitudinal cross-section, which is equal to at least 40% of the height H of the belt tooth and which for the FIG. 4 embodiment is preferably equal to about 50% of the height H and for the FIG. 2 embodiment is preferably equal to about 70% of the height H of the belt tooth.

For a given width W, the tooth height H is determined such that the height H to width W ratio is within a first predetermined range, namely, between 0.50 and 0.67, with the preferred height H being equal to 0.60 of the width W.

The curvature of the arcuate flanks 21, 22 of the belt tooth 13 is chosen such that when a line T is drawn tangentially to the corresponding flank, e.g. to arcuate flank 21 at the point J representing the point along such flank at which such arcuate flank is intersected by a line $L_3$ parallel to the belt land line L and spaced therefrom a distance equal to 0.3W (i.e. 0.3 times the width W), the pressure angle $\alpha$ formed between the tangent line T and the tooth center line X—X is within a second predetermined range, namely, between 18 degrees and 23 degrees, with the preferred pressure angle being 21.5 degrees.

By way of example, if an 8 mm. pitch belt is designed according to the embodiment of the present invention illustrated in FIG. 2, and using standard design practice, the belt dimensions would be as follows:

Example "A" (Belt)

Pitch = 0.31496"
Tooth Width (W) = 0.205"
Flank Radii (R1, R2) = 0.174"
Root Radii (R5, R6) = 0.035"
Land Length (GI) = 0.041"
Tip Radii (R3, R4) = 0.038"
Tooth Tip Land (EF) = 0.074"
Pressure Angle $\alpha$ at 0.3W = 21.5°

The radii R5 and R6 for the arcs defining the tooth roots 30 and 31 are centered on a line $L_4$ which is parallel to the belt land line L and spaced therefrom a distance which is less than the 0.3W distance of the $L_3$ line. Thus, the pressure angle $\alpha$ measurement as defined herein is taken at a location on the working surface of the flank of the belt tooth. The arcuate flank 21 therefore begins at point A and extends through point J (which is at the distance 0.3W from the belt line L measured along vertical axis X—X and at which point tangent line T to the curve 21 makes an angle $\alpha$ with the center line X—X) to point B (which lies at a vertical distance from the belt land line L equal to the height H less an amount equal to or less than the length of radius R4).

Arcuate flank 22 is formed in identical manner to the flank 21 described above and extends from point C through point K to point D.

While, according to the preferred embodiment, the belt tooth flanks 21 and 22 are the arcs of circles of radii R1 and R2 respectively, it is necessary only that they approximate closely such arcs but need not precisely describe such arcs. Thus, instead of actually being arcs of circles, the belt tooth flanks 21, 22 can alternatively have a convex curvature which in longitudinal cross-sectional representation can be defined by a curve generated by a power function $y = /ax^n/$ in which (y) and (x) are the coordinates along the (y) and (x) axes, respectively, (a) is a constant chosen in the range between 104 and 65,800 and (n) has a value chosen in the range 3 to 7.5. Alternatively, the curved flanks can (in cross-sectional contour) be generated by the involute of a circle (not shown) of a diameter Q, the center of which is located on the side of the belt land line which is opposite to the side on which the tooth is located. By way of example, a diameter Q, for a belt having the dimensions stated above for the belt of Example "A", is 0.6" centered 0.3" from the belt and line and spaced 0.005" from the center line X—X of the belt tooth on the same side thereof as the curved flank which it describes. Alternatively, the flanks can be shaped such that in cross-section their contour can be a portion of a parabola, hyperbola, or ellipse, all of which would result in curves 21, 22 which closely approximate the arc of a circle having a radius R1 or R2.

To the extent an actual arc of a circle is used, the preferred length of radiis R1 and R2 is approximately 0.85 times the tooth width dimension (W). Preferably, the pressure angle $\alpha$ of the belt tooth is 21.5 degrees, the length (l) of line 32 is equal to 0.2 times the belt tooth width (W), the length of tooth tip line 27 is 0.36 times the belt tooth width (W) or 0.36W, the tooth height H is 0.64W, the tip of belt tooth 13 is formed by identical non-intersecting arcs 25 and 26 of radii equal to 0.19 times the belt tooth width (W) and joined together by a straight tooth tip line 27. The centers 28 and 29 of tooth tip arcs 25 and 26 are located equidistant on opposite sides of tooth center line X—X along a line parallel to the belt land line (L) and spaced therefrom a distance equal to H minus the length of radius R3. R3 being equal to R4. The distance of the centers 28 and 29 of tooth tip radii R3 and R4, respectively, from center line X—X, is chosen such that a smooth transition will result between the arcs 25, 26 and the arcuate flanks 21, 22 on the one hand and the line 27, on the other hand.

Figure 3:
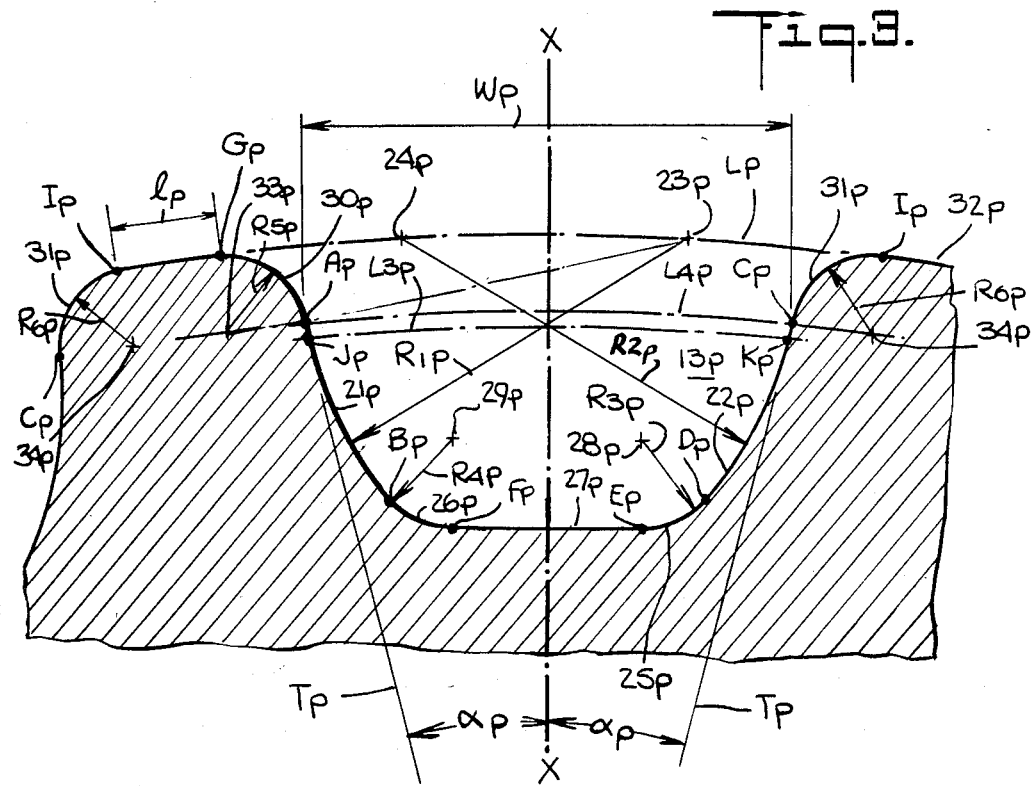
FIG. 3 is an enlarged fragmentary longitudinal cross-sectional view of a pulley in accordance with this invention, suitable for mating with the belt of FIG. 2.

FIG. 3 shows a typical profile of a pulley tooth and cavity according to the invention. The profile of the tooth and cavity is made up as follows. Each cavity 13p is of substantially U-shaped longitudinal cross-section and is formed by two non-intersecting curved lines, 21p, 22p, a cavity bottom portion 27p, a pair of cavity bottom curved lines 25p and 26p and a pair of curved cavity top lines 30p and 31p. Cavity flank line 21p is drawn from a center 23p, is of radius R1p and extends from point Ap to point $B_p$. The flank arc 22p is drawn from center 24p, is of radius R2p and extends from point Cp to point Dp. The centers 23p and 24p are displaced from each other and lie on opposite sides of the radial center line X—X of the pulley groove. The center 23p and the arc 21p drawn from that center lie on the opposite sides of the center line X—X, and similarly, the center 24p and arc 22p drawn from that center lie on the opposite sides of the center line X—X. The radii R1p and R2p are equal, and the centers 23p and 24p lie at equal radial distances from the center of the pulley and preferably lie on or closely adjacent to the pulley land line Lp which is the circle representing the outermost circumference of the pulley and which includes the pulley land areas, represented in longitudinal cross-section by the line segment 32p of length lp in FIG. 3. The centers 23p and 24p, furthermore, lie at equal distances to opposite sides of the center line X—X.

Each pulley tooth tip is formed by two non-intersecting curved lines 30p and 31p each approximating to an arc of a circle, connected by the line segment 32p. The arc 30p is drawn from center 33p, has a radius $R5_p$ and extends from point Ap to point Gp. The arc 31p is drawn from center 34p has a radius $R6_p$ and joins points Ip and Cp. The centers 33p and 34p are displaced from one another on a circle concentric with the circle representing the pulley land line Lp and having a radius equal to the outer circumference of the pulley less the length of radius R5p. The centers 33p and 34p of a pulley tooth tip are spaced apart a distance lp equal to the length of the pulley tooth land segment represented in longitudinal cross-section by the arcuate line 32p. The radii R5p and R6p are equal. The line segment 32p is part of an arc of a circle having a radius drawn from the center of the pulley and forming the pulley land line Lp.

The arc 21p defining one flank of the pulley cavity and the arc 30p defining part of the adjacent pulley tooth tip are joined, i.e. intersect, at point $A_p$. Similarly, the arc 22p defining the other flank of the pulley cavity is joined to (i.e. intersects) the arc 31p of the adjacent pulley tooth tip at point $C_p$. The profile from point Ip to point Ip in FIG. 3, is repeated around the circumference of the pulley to define the other teeth and cavities.

The line segment 27p joins point Ep and Fp to form the base of the pulley cavity. A pair of arcs 26p and 25p, connect the points Ep and Fp to the points Dp and Bp, respectively. The arc 25p is drawn from center 28p, is of radius R3p and extends from point Dp to point Ep. The arc 26p is drawn from center 29p, is of radius R4p and extends from point Bp to point Fp. The centers 28p and 29p are displaced from each other and lie at equal distances to opposite sides of the radial center line X—X of the pulley cavity 13p. The center 28p and the arc 25p drawn from that center lie to the same side of the center line X—X, and similarly, the center 29p and the arc 26p drawn from that center lie on the same side of the center line X—X. The radii R3p and R4p are equal and the centers 28p and 29p lie at equal distances from the center of the pulley and thus also at equal distances from the base 27p of the cavity 13p. For a given depth Hp (measured along a pulley radius) of pulley cavity 13p, a given length of cavity bottom segment 27p, a given length lp of pulley tip land, a given pulley diameter and a given number of pulley teeth, as well as given lengths for the radii R1p and R2p, the radii of the curves 25p, 26p, 30p and 31p, as well as the locations of their centers of curvature, are chosen such that smooth transitions are provided between the curve 21p and land segment 32p, on the one hand, and between curve 21p and pulley cavity bottom 27p, on the other hand. Similarly, the curves 25p and 31p are chosen such as to provide smooth transitions between the curved flank 22p and the pulley tip land 32p, on the one hand, and between the curved flank 22p and the pulley cavity bottom segment 27p on the other hand.

The curvature of flank segment 21p defining one wall of the pulley cavity is such that it closely approximates a portion of a circle having a radius R1p and passes through point Jp as it extends from point Ap to point Bp. Point Ap is the point at which root arc 30p intersects the convex arcuate flank 21p. Similarly, point Cp is the point at which the root arc 31p intersects convex arcuate flank 22p. Points Ap and Cp are located on a circle L4p which is concentric with the center of the pulley. It is between points Ap and Cp at which the pulley width Wp is measured. A second circle $L_{3p}$, concentric with the pulley and having a radius equal to the maximum pulley radius (i.e. the radius of a circle represented by Lp) minus an amount equal to 0.3Wp, intersects the arcs 21p and 22p at points Jp and Kp, respectively. The curvature of arcuate flanks 21p and 22p is such that lines drawn tangent to the flanks 21p, 22p at points Jp and Kp, respectively, form with the center line X—X of the pulley cavity 13p an angle $\alpha_p$.

We have found that for a belt tooth as described above with respect to FIG. 2, with a pressure angle α between 18 and 23 degrees, with a height H equal to between 0.50 and 0.67 of the belt tooth width W and with a ratio of flank radius of curvature R1, R2 to tooth width W of between 0.7 and 0.9, the mating pulley cavity should have a flank pressure angle $\alpha_p$ measured at a distance of 0.3Wp from the pulley land line $L_p$ of between 18.5 and 23.5 degrees with a depth $H_p$ of between 0.47 and 0.64 of the cavity width $W_p$ and a ratio of pulley cavity flank radius of curvature $R1_p$ $R2_p$ to cavity width $W_p$ between 0.67 and 0.87. Accordingly, the preferred pulley cavity for belt example "A" above would have the following dimensions:

Example "A" (Pulley)

Pitch = 0.31496"
Cavity Width ($W_p$) = 0.209"
Cavity Flank Radii ($R1_p$, $R2_p$) = 0.169"
Cavity Tip Radii ($R5_p$, $R6_p$) = 0.033"
Cavity Bottom Radii ($R3_p$, $R4_p$) = 0.038"
Bottom Connecting Line ($27_p$) = 0.080"
Pulley Flank Pressure Angle $\alpha_p$ at 0.3W = 22°

The following table shows the comparison between a 8 mm pitch power transmission system according to the embodiment of FIGS. 2 and 3 of the present invention and the Miller patent:

|  | Belt, Pulley Pitch | Belt Tooth Width (W) | Pulley Cavity Width (Wp) | Pulley Cavity Flank to Belt Tooth Flank Clearance (c) | Effective Pressure Angle (α, αp) |
|---|---|---|---|---|---|
| New Design | 8 mm | 0.205" | 0.209" | 0.005" | 21.5° |
| Miller | 8 mm | 0.203" | 0.220" | 0.016" | 11.8° |

As shown in the table, the power transmission system according to the present invention, exhibits approximately 69% less clearance (c) between the belt tooth flank and the pulley groove flank as measured along the $0.3W_p'$ line than is exhibited by a power transmission system designed in accordance with the teachings of the Miller patent. The foregoing comparison figures are the result of comparing graphic layouts of the power transmission systems designed in accordance with the present invention and those of the Miller design. Since in FIG. 6 the system is in no load condition the clearance (c) is equal to the aggregate clearances shown as (½c) and (½c) on opposite sides of the belt tooth 13.

It should be noted that, in each of the embodiments in accordance with the invention, the belt tooth flank arc 21 is tangent to the tooth root arc 30 at a point A which lies on a line connecting the center point 23 of radius R1 and the center point 33 of radius R5. Similarly, the point C on the other side of tooth 13 represents the point at which arc 22 meets and is tangent to, the tooth root arc 31 and is a point on the line connecting the centers 24 and 34 of arcs 22 and 31 respectively. The same relationship exists with respect to the location of centers 33p and 34p in FIG. 3 and for the corresponding belt tooth root and pulley tooth tip centers in FIGS. 4 and 5.

The line T which is tangent to the arcuate belt flank line 21 at the intersection J between the arcuate line 21 and a line drawn parallel to the belt land line L and spaced the distance 0.3W therefrom does not pass through point A. In other words, points A and J, as herein defined, are always spaced from one another and these two points, in turn, provide one of the parameters for arc 21, since whichever curve (closely approximating the arc of a circle, as above described) is used for arc 21, that curve must pass through the two given points A and J.

Similarly, the curve constituting flank 22 must pass through the given points C and K, so that the latter points provide one of the parameters for arc 22.

Figure 5:
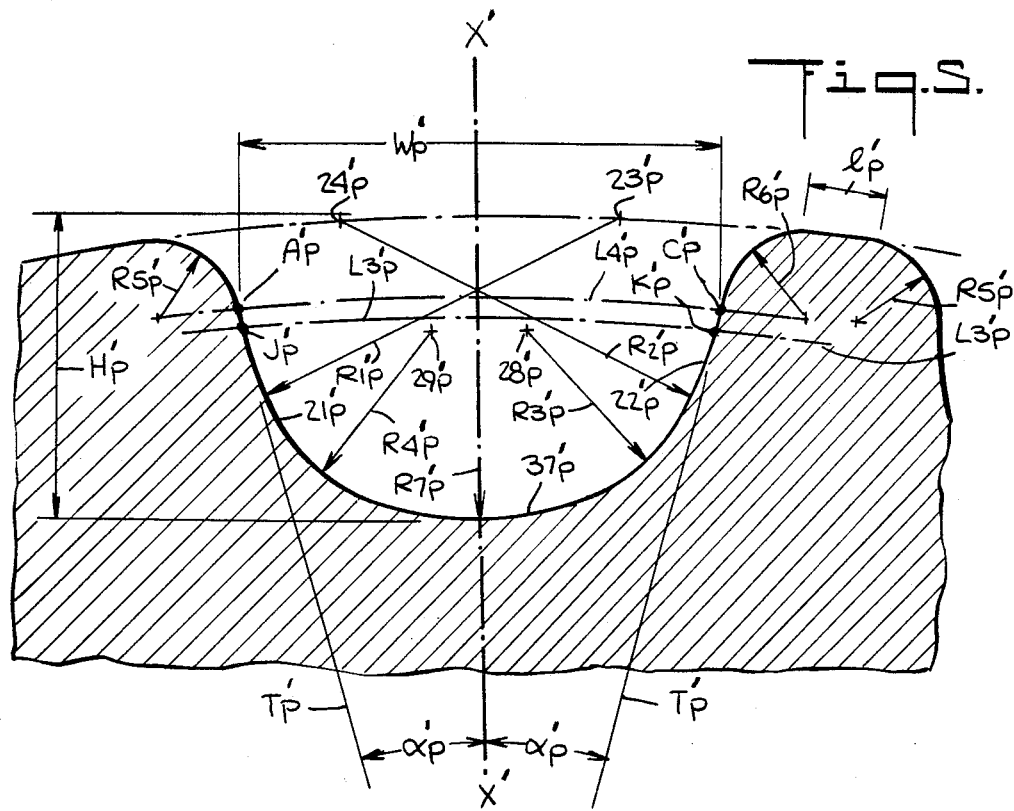
FIG. 5 is an enlarged fragmentary longitudinal cross-sectional view of another embodiment of a pulley adapted to mate with the belt shown in FIG. 4.

Another preferred embodiment of the invention is shown in FIGS. 4 and 5. The belt and pulley in FIGS. 4 and 5 are identical in all respects with the belt and pulley, shown in FIGS. 2 and 3, except that instead of the flat belt tooth tip line 27 and the flat pulley cavity bottom portion 27p in FIGS. 2 and 3, the FIGS. 4 and 5 embodiments have a convex arcuate belt tooth tip portion 37' and a concave arcuate pulley cavity bottom portion 37'p, respectively.

The radius R7' of the belt tooth tip portion 37' of FIG. 4 has its center (not shown) located along an extension of the belt tooth center line X'—X'. In the embodiment the tooth height H' is the distance between the belt land line L' and the point of intersection of the convex curve 37' with the tooth center line X'—X'. The reference numbers in FIGS. 4 and 5 are the same as the reference numerals in FIGS. 2 and 3 for substantially identical parts except that in FIGS. 4 and 5 each reference numeral is followed with a prime (') designation.

Similarly, the pulley cavity of FIG. 5 has, with respect to the body of the pulley, a concave bottom 37p' formed by a radius R7p' having its center (not shown) on the cavity center line X'—X'. The various radii forming the pulley cavities of FIGS. 3 and 5, it will be seen, are chosen so as to be conjugate to the belt teeth of FIGS. 2 and 4, respectively.

According to the embodiment shown in FIG. 4, the belt teeth 13' preferably have a height H' equal to 0.63W', a pressure angle $\alpha'$ equal to 21.5 degrees, a land segment 32' between the root portion of adjacent teeth 13' having a length equal to 0.49W', flank radii R1' and R2' equal to 0.85W' and having their centers 23', 24' located on the belt land line L', tooth tip radii R3' and R4' equal to 0.19W' and a convex tooth tip surface line 37', joining the arcs 25' and 26' and formed by a radius R7' having its center on the intersecton of the belt land line with center line X'—X' and having a length equal to 0.63W'.

In FIG. 6 of the drawings the belt and pulley are shown in meshed, but in no-load, condition. In other words FIG. 6 represents a belt according to the FIG. 4 embodiment of the present invention "wrapped around", but not torque loaded, with respect to, a pulley according to FIG. 5. For the embodiment depicted in FIG. 6 the belt tooth tip is in "touch" contact with the bottom of the pulley cavity and the pulley tooth tip is in "touch" contact with the belt land area. Such contact is however not essential to the invention, since relative belt height and pulley cavity depth can be varied to permit either some compression at the aforesaid surfaces or, alternatively, some clearance at those surfaces and still result in a high-torque, low-backlash system as long as the other parameters of this invention are adhered to.

EXAMPLES

The following dimensional relationships are given by way of example:

(A) For the belt shown in FIG. 2 the preferred measure for angle alpha ($\alpha$) is 21.5°, the preferred tooth height H is 0.63W, the preferred length of line 1 is 0.49W, the preferred length of radii R1 and R2 is 0.85W, the preferred length of tooth tip radii R5 and R6 is 0.19W.

(B) For the embodiment illustrated in FIG. 4 the preferred dimensions are the same as those shown above with respect to FIG. 2 except that instead of the straight line segment 27 the tooth tip according to FIG. 4 has a curved convex tip land area represented in longitudinal cross-section by line segment 37' which is the arc of a circle of radius equal to 0.63W'.

(C) Another belt according to the FIG. 2 embodiment may have the following dimensional relationships. A tooth tip height H equal to 0.60W, pressure angle alpha equal to 21.5°, root radii R5 and R6 equal to 0.2W, flank radii R1 and R2 equal to 0.85W, tip radii R3 and R4 equal to 0.19W and tooth tip connecting line 27 having a length equal to 0.36W.

(D) The preferred pulley according to FIG. 3 has a pressure angle $alpha_p$ in the range of 18.5° to 23.5°, a pulley tooth tip land havng a length lp in the range of from 0.1 to $0.65W_p$, and a pulley cavity depth $H_p$ in the range of 0.47 to $0.64W_p$. Preferably, $\alpha p$ is 22°, the radii $R1_p$ and $R2_p$ equal $0.81W_p$ (or, alternatively, the convex arcuate flanks of the pulley cavity may be described by the eqution $y=/ax^n/$where (a) is a constant between 104 and 65,800 and n has a value from 3 to 7.5, the depth of the pulley cavity is preferably equal to $0.59W_p$ and the radii at the bottom of the cavity are equal to $0.18W_p$ and are connected by a straight line of length preferably equal to $0.38W_p$.

(E) In a preferred power transmission system according to FIG. 6 of the present invention, the following dimensional relationships exist:

The belt tooth height H' is equal to 0.63W', the belt tooth flank pressure angle alpha equals 21.5°, the length of the belt land 1' is equal to 0.49W', the radii R1' and R2' of the convex arcuate flanks 21' and 22' equal 0.85W, the tooth tip radii R3' and R4' equal 0.19W', the curved belt tooth tip (according to the FIG. 4 embodiment) is formed by the arc of a circle of radius 0.63W', the pulley pressure angle $\alpha'p$ equals 22°, the pulley cavity depth $H'_p$ (according to the FIG. 5 embodiment) of the pulley equals $0.61W'_p$, the flank arcs $21p'$, $22p'$ of the pulley cavity equal $0.81W_p'$, the pulley cavity bottom arcs equal $0.36W_p'$ and are connected by a curved connecting line having a radius equal to $0.60W_p'$, and the belt tooth width W' is approximately 0.98 of the pulley cavity width $W'_p$.

The benefit of the reduced clearance of the new design is shown by the following, which is typical of drives used for mechanical positioning systems such as those used in connection with automated sewing machine tables. If, in one system consisting of a reversable electric motor and a rotating load the latter are connected by a pair of 22 cavity 8MM pitch pulleys and a 8MM pitch belt of the Miller design as sold commercially by Uniroyal, Inc., and in a second system comprising an identical reversable electric motor and an identical rotating load, the later are connected by a pair of 22 cavity 8MM pitch pulleys and a 8MM pitch belt of the design according to the present invention, we can calculate the angular displacement (lag) which occurs between the rotational position of the driving pulley and the driven pulley when the applied driving force, in this case the electric motor, is reversed. For the power transmission system using the Miller belt and pulleys the lag is calculated to be approximately 0.9° while with pulleys and belt according to the new design of this invention the lag would be reduced to approximately 0.3°. Using the example of the automated sewing machine table, the reduction in lag (i.e. backlash) would result in a substantial reduction in table overtravel and therefore the response to system command would be substantially improved.

While there has been described what is at present considered to be preferred embodiments of this invention it will be obvious to those skilled in the art that various changes and modifications may be made therein without departing from the spirit of the invention, and it is, therefore, aimed to cover all such changes and modifications as fall within the scope and spirit of this invention.

What is claimed is:

1. A flexible power transmission belt having a plurality of teeth, said belt teeth being separated by belt cavity portions, each belt tooth in longitudinal cross-section being symmetrical about a belt tooth center line, said belt tooth including a root portion, a tip portion and opposite convex arcuate flank portions extending from said tip portion, each said belt cavity portion being symmetrical about a belt cavity center line, said belt tooth root portion being defined at least partly by first and second arcs approximating the arc of a circle on opposite sides of said belt tooth center line extending into the corresponding flank portions of the belt tooth and said belt cavity having a base portion connecting said first arc of each tooth with said second arc of the next consecutive tooth, said base portion which in longitudinal cross-section is a line coinciding with a belt land line which is colinear with base portions of other belt cavities on said belt, said belt tooth having a height dimension measured between the extremity of said tooth tip portion and said belt land line and having a width dimension measured between said opposite flank portions along a line parallel to such belt land line and including the points at which said first and second arcs intersect said flank portions, said belt tooth having a height to width relation within a first predetermined range, each said opposite flank portion being formed of a curve which approximates the arc of a circle whose center of curvature lies substantially on said belt land line on the side of the belt tooth center line which is opposite that of the flank portion in question and which curve is such that a tangent line drawn to it at the point thereon which is at a distance from the belt land line equal to 0.3 times the width dimension of the belt tooth forms an angle with respect to the tooth center line which is within a second predetermined range, wherein said first predetermined range is from 0.50 to 0.67 and said second predetermined range is from 18 degrees to 23 degrees.

2. The flexible power transmission belt of claim 1 wherein the longitudinal length of said belt cavity base portion measured along said belt land line is in the range of 0.2 to 0.66 of said tooth width dimension.

3. A flexible power transmission belt having a plurality of teeth separated from each other by a plurality of alternating belt land areas, each tooth having a center line and comprising a pair of opposed flanks each of which in longitudinal cross-section has a generally convex arcuate contour, each flank being joined to the adjacent belt land area by a root having an arcuate contour approximating an arc of a circle having a given first radius and having a tooth tip portion connecting said pair of flanks at a location spaced from said root, each tooth having a longitudinal width dimension measured between the points where said root arcs intersect the opposing flanks of the belt tooth and a height dimension measured from the belt land line representing an extension in longitudinal cross-section of the belt land area to the outermost surface portion of the tooth tip, said height dimension being in the range 0.50 to 0.67 of said tooth width dimension, each of the arcuate flanks approximating an arc of a circle and being formed such that a line drawn tangent thereto at a point spaced a distance equal to 0.3 times the said width dimension from the belt land line will intersect the tooth center line at an angle in the range of 18° to 23°, and said belt land area joining the root of adjacent teeth, having a length dimension in longitudinal cross-section in the range 0.2 to 0.66 of said tooth width dimension.

4. The flexible power transmission belt of claim 3 wherein said angle is between 20° and 22°.

5. The flexible power transmission belt of claim 3 wherein said angle is 21.5°.

6. The flexible power transmission belt of claim 3 in which said tooth tip portion exhibits in longitudinal cross-section a contour comprised of a pair of non-intersectng arcs joined by a straight line.

7. The flexible power transmission belt of claim 6 wherein said height dimension is equal to 0.60 times the width dimension, said angle is 21.5°, said length dimension of said belt land area is 0.2 times the tooth width dimension, said pair of non-intersecting arcs at the tooth tip have radii equal to 0.19 times the tooth width dimension, said straight line joining said tooth tip arcs having a length equal to 0.36 times the tooth width dimension and each said convex flank being an arc of a circle whose center lies on said belt land line and whose radius is equal to 0.85 times the tooth width dimension.

8. The flexible power transmission belt of claim 3 in which said tooth tip exhibits in longitudinal cross-section a contour comprised a pair of non-intersecting arcs joined by a convex curve.

9. The flexible power transmission belt of claim 8 wherein said height dimension is equal to 0.63 times the width dimension, said angle is 21.5°, said length dimension of said belt land area is 0.49 times the tooth width dimension, said pair of non-intersecting arcs at the tooth tip having radii equal to 0.19 times the tooth width dimension, said convex curve joining said tooth top arcs being an arc of a circle having its center on the belt land line and having a radius of a length equal to 0.63 times the tooth width dimension and each said convex flank being an arc of a circle whose center lies on said line which is an extension of said belt land areas and whose radius is equal to 0.85 times the tooth width dimension.

10. The flexible power transmission belt of claim 3 wherein the tooth tip exhibits in longitudinal cross-section a contour comprised of a convex curvilinear portion which is a continuation of said generally convex arcuate flanks.

11. The flexible power transmission belt of claim 3 wherein the generally convex arcuate flanks are in longitudinal cross-section, a curve described by the equation $y = /ax^n/$ where (a) is a constant between 104 and 65,800 and (n) has a value in the range of from 3 to 7.5.

12. The flexible power transmission belt of claim 3 wherein the generally convex arcuate flanks are formed by arcs of a circle centered on the belt land line, the radii of said arcs being in the range of between 0.7 and 0.9 of the belt tooth width.

13. The flexible power transmission belt of claim 3 wherein the generally convex arcuate flanks are formed by arcs of a circle centered on the belt land line, the radii of said arcs being equal to 0.85 times the belt tooth width.

14. The flexible power transmission system of claim 3 wherein the generally convex arcuate flanks are aproximated by involutes of a circle.

15. A power transmission system comprising the combination of (A) an endless flexible power transmission belt having a succession of identical teeth uniformly spaced apart, said belt having land areas between consecutive teeth and the outer surfaces of said land areas, in cross-section, defining a belt land line L, each tooth having substantially identical fore and aft convex flank surfaces with at least part of said fore and aft flank surfaces shaped in cross-section as a curve approximating the arc of a circle centered on the line L, each said belt tooth having a root portion connecting said flank curves to the respective land areas and havng a tip portion connecting the opposite ends of said flank curves to each other, said tooth having a height H measured from said line L to the extremity of said tip portion, said tooth having a width W measured between the end points of said flank curves where said flank curves meet said root portions, the curvature of said arcuate flanks being such that a tangent line drawn thereto at a point which is spaced from the belt line L a distance equal to 0.3 times the width dimension W will make an angle alpha with the vertical center line of the belt tooth, said belt tooth having a height-to-width relation within a first predetermined range and an angle alpha within a second predetermined range, said first predetermined range being 0.50 to 0.67 and said second predetermined range being 18° to 23° and (B) a pulley having a plurality of identical peripheral belt-engaging teeth defining between them pulley cavities, wherein each pulley cavity possesses substantially identical fore and aft flank surfaces, at least part of each said flank surfaces being shaped in cross-section as a curve approximating the arc of a circle and said pulley teeth having pulley land surfaces at the tips thereof, said land surfaces defining in longitudinal cross-section portion of a pulley land line $L_p$ approximating a circle concentric with the center of the pulley and said pulley cavity having a cavity bottom portion connecting the opposite arcuate flanks thereof at points on said flanks furthest spaced from said pulley land line $L_p$, each said pulley tooth tip having arcuate portions adjacent the pulley land line $L_p$ and joining the respective arcuate flank portions to the adjacent pulley land areas and said cavity having a width dimension $W_p$ measured between corresponding points of said arcuate flank portions where said arcuate portions of said pulley tooth tip connect with the respective arcuate flank surfaces, said cavity having a depth Hp measured between said pulley land line $L_p$ and the portion of the cavity bottom portion which is spaced furthest from said pulley land line $L_p$, the curvature of said cavity flank surfaces being such that they are substantially concave with respect to the body of the pulley and that a line drawn tangent thereto at a point thereon spaced from said pulley land line $L_p$ a distance 0.3 times said width dimension $W_p$ makes an angle $\alpha p$ with the center line of said pulley cavity, said pulley cavity having a dept-to-width relation within a third predetermined range and said angle $\alpha p$ being within a fourth predetermined range, wherein said third predetermined range is from 0.74 to 0.64 and said fourth predetermined range is from 18.5° to 23.5°.

16. The power transmission system of claim 15 wherein said belt tooth width W is within the range of 0.95 to 1.00 of the pulley cavity width $W_p$.

17. The power transmission system of claim 16 wherein said belt tooth width W is within the range of 0.97 to 0.99 of the pulley cavity width $W_p$.

18. The power transmission system of claim 16 wherein the belt tooth width W is approximately 0.98 of the pulley cavity width $W_p$.

19. The power transmission system of claim 15 wherein the belt land area has a substantially flat surface portion between adjacent teeth and the longitudinal length of said flat surface portion is within a fifth predetermined range, said fifth predetermined range being between 0.2 to 0.66 of the belt tooth width W.

20. The power transmission system of claim 19 wherein the height H is equal to 0.60W, the angle alpha is equal to 21.5° and the longitudinal length of said substantially flat surface portion between adjacent belt teeth is equal to 0.2W, said curved flank portions of said belt teeth being arcs of circles of radius R, said radii R being centered substantially on said belt land line L and said radii R being equal to 0.85W.

21. The power transmission system of claim 15 wherein said pulley tooth tips have a substantially flat tip land area the length of which in longitudinal cross-section is within a sixth predetermined range, said sixth predetermined range being between 0.1 to 0.65 of the width $W_p$ of the pulley cavity.

22. The power transmission system of claim 15 wherein the belt tooth height H is equal to the pulley cavity depth Hp.

23. The power transmission system of claim 15 wherein the belt tooth height H exceeds the pulley cavity depth Hp.

24. The power transmission system of claim 15 wherein the pulley cavity depth Hp exceeds the belt tooth height H.

25. The power transmission system of claim 15 wherein the length of each of the arcuate flanks of the belt tooth measured along the outline of such flank in longitudinal cross-section is at least equal to 40% of the height dimension H.

26. The power transmission system of claim 15 wherein the angle $\alpha p$ is 22°, the depth Hp of the pulley cavity is equal to 0.59 of the pulley cavity width $W_p$, and the pulley cavity flank portions being arcs of circles having a radius equal to 0.81 times the pulley cavity width $W_p$ and centered on the pulley land line $L_p$.

27. The power transmission system of claim 15 in which the belt tooth tip portion comprises in longitudinal cross-section a pair of non-intersecting arcs of radius equal to 0.19W. and a substantially straight connecting line of length 0.36W forming the outer extremity of said tooth and connecting said non-intersecting arcs.

28. The power transmission system of claim 27 wherein said bottom portion of said pulley cavity comprises a pair of non-intersecting arcs of radii equal to 0.18 times the pulley cavity width $W_p$ and the bottom surface of the pulley cavity is defined by a straight line of length equal to 0.38 times the pulley cavity width $W_p$ and connecting said pair of non-intersecting arcs.

29. The power transmission system of claim 15 wherein each said curved flank portions of said belt teeth and of said pulley cavities approximates an arc of a circle centered on the corresponding land line of the belt and pulley respectively, on the side of the center line opposite to the one at which the respective curved flank portion is located.

30. The combination of (A) an endless flexible power transmission belt having a succession of identical teeth uniformly spaced apart, said belt having land areas between consecutive teeth and the outer surfaces of said land areas, in longitudinal cross-section, defining a belt land line L, each tooth having substantially identical fore and aft convex flank surfaces with at least part of said fore and aft flank surfaces shaped in longitudinal cross-section as a curve approximating the arc of a circle centered substantially on the line L, each said belt tooth having a root portion connecting said flank curves to the respective land areas and having a tip portion connecting the opposite ends of said flank curves, said tooth having a height H measured from said line L to the extremity of said tip portion, a width W measured between the end points of said flank curves where said flank curves meet said root portions, the curvature of said arcuate flanks being such that a tangent line drawn thereto at a point which is spaced from the belt land line L a distance equal to 0.3 times the width dimension W will make an angle alpha with the vertical center line of the belt tooth, said belt tooth having a height-to-width relation within a first predetermined range and an angle alpha within a second predetermined range, said first predetermined range being 0.50 to 0.67 and said second predetermined range being 18° to 23° and (B) a pulley having a plurality of identical peripheral belt-engaging teeth defining between them pulley cavities, wherein each pulley cavity is substantially the conjugate of one said belt tooth.

31. A power transmission system comprising the combination of (A) an endless flexible power transmission belt having a succession of identical teeth uniformly speaced apart, said belt having land areas between consecutive teeth and the outer surfaces of said land areas, in cross-section, defining a belt land line L, each tooth having substantially identical fore and aft convex flank surfaces with at least part of said fore and aft flank surfaces shaped in cross-section as a curve approximating the arc of a circle centered on the line L, each said belt tooth having a root portion connecting said flank curves to the respective land areas and having a tip portion connecting the opposite ends of said flank curves to each other, said tooth having a height H measured from said line L to the extremity of said tip portion, said tooth having a width W measured between the end points of said flank curves where said flank curves meet said root portions, the curvature of said arcuate flanks being such that a tangent line drawn thereto at a point which is spaced from the belt line L a distance equal to 0.3 times the width dimension W will make an angle alpha with the vertical center line of the belt tooth, said belt tooth having a height H equal to 0.60W and an angle alpha equal to 21.5°, said root portion having a pair of arcuate portions at opposite ends of said land area and said land area between said arcuate portions being equal to 0.2W in length, said curved portion of said arcuate flanks being the arc of a circle of radius equal to 0.85W and centered belt land line L, said belt tooth tip comprising in longitudinal cross-section a pair of non-intersecting arcs having radii equal to 0.19W and a substantially straight line of length equal to 0.36W connecting said non-intersecting arcs and (B) a pulley having a plurality of identical peripheral belt-engaging teeth defining between them pulley cavities, wherein each pulley cavity possesses substantially identical fore and aft flank surfaces, at least part of each said flank surface being shaped in cross-section as a curve approximating the arc of a circle and said pulley teeth having pulley land surfaces at the tips thereof, said land surfaces defining in longitudinal cross-section a portion of a pulley land line $L_p$ approximating a circle concentric with the center of said pulley and said pulley cavity having a cavity bottom portion connecting the opposite arcuate flanks thereof at points on said flanks furthest spaced from said pulley land line $L_p$, each said pulley tooth tip having arcuate portions adjacent the pulley land line $L_p$ and joining the respective arcuate flank portions to the adjacent pulley land areas and said cavity having a width dimension $W_p$ measured between corresponding points of said arcuate flank portions where said arcuate portions of said pulley tooth tip connect with the respective arcuate flank surfaces, said cavity having a depth Hp measured between said pulley land line $L_p$ and the portion of the cavity bottom portion which is spaced furthest from said pulley land line $L_p$, the curvature of said cavity flank surfaces being such that they are substantially concave with respect to the body of the pulley and that a line drawn tangent thereto at a point thereon spaced from said pulley land line $L_p$ a distance 0.3 times said width dimension $W_p$ makes an angle $\alpha p$ with the center line of said pulley cavity, said pulley cavity having a depth-to-width relation within a third predetermined range and said angle $\alpha p$ being within a fourth predetermined range, wherein said third predetermined range is from 0.47 to 0.64 and said fourth predetermined range is from 18.5° to 23.5°.

32. The power transmission system of claim 31 wherein said belt tooth width W is approximately 0.98 of the pulley cavity width $W_p$.

33. The power transmission system of claim 32 wherein the angle $\alpha p$ is 22°, the pulley cavity depth is 0.59 of the pulley cavity width $W_p$, each said substantially concave arcuate flank surface is formed by an arc of a circle centered on said pulley land line $L_p$ and having a radius equal to $0.81W_p$, said pulley cavity bottom portion comprising a pair of non-intersecting arcs of radii equal to $0.18W_p$ and a straight line bottom portion connecting said pair of non-intersecting arcs and being of a length equal to $0.38W_p$.

34. A power transmission system comprising the combination of (A) an endless flexible power transmission belt having a succession of identical teeth uniformly spaced apart, said belt having land areas between consecutive teeth and the outer surfaces of said land areas, in cross-section, defining a belt land line L, each tooth having substantially identical fore and aft convex flank surfaces with at least part of said fore and aft flank surfaces shaped in cross-section as a curve approximating the arc of a circle centered on the line L, each said belt tooth having a root portion connecting said flank curves to the respective land areas and having a tip portion connecting the opposite ends of said flank curves to each other, said tooth having a height H measured from said line L to the extremity of said tip portion, said tooth having a width W measured between the end points of said flank curves where said flank curves meet said root portions, the curvature of said arcuate flanks being such that a tangent line drawn thereto at a point which is spaced from the belt line L a distance equal to 0.3 times the width dimension W will make an angle alpha with the vertical center line of the belt tooth, said belt tooth having a height H equal to 0.63W and an angle alpha equal to 21.5°, said root portion having a pair of arcuate portions at opposite ends of said land area and said land area between said arcuate portions being equal to 0.49W in length, said curved portion of said arcuate flanks being the arc of a circle of radius equal to 0.85W and centered on belt land line L, said belt tooth tip comprising in longitudinal cross-section a pair of non-intersecting arcs having radii equal to 0.19W and a curved line of radius equal to 0.63W connecting said non-intersecting arcs and centered on said belt land line L and (B) a pulley having a plurality of identical peripheral belt-engaging teeth defining between them pulley cavities, wherein each pulley cavity possesses substantially identical fore and aft flank surfaces, at least part of each said flank surfaces being shaped in cross-section as a curve approximating the arc of a circle and said pulley teeth having pulley land surfaces at the tips thereof, said land surfaces defining in longitudinal cross-section a portion of a pulley land line $L_p$ approximating a circle concentric with the center of the pulley and said pulley cavity having a cavity bottom portion connecting the opposite arcuate flanks thereof at points on said flanks furthest spaced from said pulley land line $L_p$, each said pulley tooth tip having arcuate portions adjacent the pulley land line $L_p$ and joining the respective arcuate flank portions to the adjacent pulley land areas and said cavity having a width dimension $W_p$ measured between corresponding points of said arcuate flank portions where said arcuate portions of said pulley tooth tip connect with the respective arcuate flank surfaces, said cavity having a depth Hp measured between said pulley land line $L_p$ and the portion of the cavity bottom portion which is spaced furthest from said pulley land line $L_p$, the curvature of said cavity flank surfaces being such that they are substantially concave with respect to the body of the pulley and that a line drawn tangent thereto at a point thereon spaced from said pulley land line $L_p$ a distance 0.3 times said width dimension $W_p$ makes an angle αp with the center line of said pulley cavity, said pulley cavity having a depth-to-width relation within a third predetermined range and said angle αp being with a fourth predetermined range, wherein said third predetermined range is from 0.47 to 0.64 and said fourth predetermined range is from 18.5° to 23.5°.

35. The power transmission system of claim 34 wherein said belt tooth width W is approximately 0.98 of the pulley cavity width $W_p$.

36. The power transmission system of claim 35 wherein the angle αp is 22°, the pulley cavity depth is 0.61 of the pulley cavity width $W_p$, each said substantially concave arcuate flank surfaces is formed by an arc of a circle centered on said pulley land line $L_p$ and having a radius equal to $0.81W_p$, said pulley cavity bottom portion comprising a pair of non-intersecting arcs of radii equal to $0.36W_p$ and a curved line connecting said pair of non-intersecting arcs and being formed with a radius of a length equal to $0.60W_p$.

* * * * *